(12) United States Patent
Kang et al.

(10) Patent No.: US 6,184,956 B1
(45) Date of Patent: Feb. 6, 2001

(54) REFLECTIVE PLATE FOR REFLECTIVE LIQUID CRYSTAL DISPLAY AND METHOD FOR MAKING THE SAME

(75) Inventors: Seung-Gon Kang; Byung-Hee Kim, both of Kyonggi-do; Sun-Hwa Kim; Young-Il Choi, both of Seoul; Hyun-Eok Shin, Kyonggi-do, all of (KR)

(73) Assignee: Samsung Display Devices Co., Ltd. (KR)

( * ) Notice: Under 35 U.S.C. 154(b), the term of this patent shall be extended for 0 days.

(21) Appl. No.: 09/287,606

(22) Filed: Apr. 7, 1999

(30) Foreign Application Priority Data

Apr. 9, 1998 (KR) .................................................. 98-12544

(51) Int. Cl.⁷ ........................ G02F 1/1335; G02F 1/1339
(52) U.S. Cl. ............................................. 349/113; 349/155
(58) Field of Search .................................... 349/113, 155; 428/141

(56) References Cited

U.S. PATENT DOCUMENTS

| | | | |
|---|---|---|---|
| 4,104,102 | * | 8/1978 | Eagon et al. ........................ 427/204 |
| 4,401,494 | * | 8/1983 | Pernicano et al. .................... 427/148 |
| 5,207,852 | * | 5/1993 | Lightle et al. ....................... 427/204 |
| 5,917,567 | * | 6/1999 | Oh et al. .............................. 349/113 |

FOREIGN PATENT DOCUMENTS 1-120530 * 5/1989 (JP) .

* cited by examiner

*Primary Examiner*—William L. Sikes
*Assistant Examiner*—Dung Nguyen
(74) *Attorney, Agent, or Firm*—Baker & McKenzie

(57) ABSTRACT

A reflective plate used in a reflective LCD includes a base substrate, a plurality of spacer cores dispersed on the base substrate, an adhesive disposed on the base substrate to attach the spacer cores on the base substrate, and a reflective layer deposited on the base substrate to cover the spacer cores and the adhesive. The base substrate is first prepared, then a plurality of spacers are dispersed on the base substrate, each of the spacers including a spacer core and an adhesive deposited around the spacer core. Next, the adhesive deposited around the spacer cores is molten and the molten adhesive is hardened so that the spacer cores are attached on the base substrate. Finally, a reflective layer is deposited on the substrate to cover the spacer cores.

19 Claims, 4 Drawing Sheets

REFLECTIVE PLATE FOR REFLECTIVE LIQUID CRYSTAL DISPLAY AND METHOD FOR MAKING THE SAME

BACKGROUND OF THE INVENTION

1. Field of the Invention

The present invention relates to a liquid crystal display (LCD) and, more particularly, to a reflective plate used in the LCD and a method for making the same.

2. Description of the Prior Art

Liquid crystal display (LCD) devices have recently undergone development to enable increases in size and improvements in definition while decreasing power dissipation. For these and other reasons, the LCD device has a most promising future.

Generally, there are two basic types of LCDs: a light transmissive type and a light reflective type.

The light transmissive LCD comprises a backlight disposed on a rear side of a liquid crystal cell. The light radiated from the backlight selectively passes through a liquid crystal, thereby realizing desired images.

The light reflective LCD comprises a reflective plate disposed on a rear side of the liquid crystal cell so as to reflect incident light toward the front side of the LCD cell, thereby realizing desired images.

The present invention is directed to the light reflective LCD, which will be referred to as a "reflective LCD."

FIG. 1 shows a conventional reflective LCD.

The conventional reflective LCD comprises upper and lower substrates 2 and 4. ITO electrode patterns 10 and 10' are disposed on opposing inner surfaces of the upper and lower substrates 2 and 4, respectively. Insulating layers 12 and 12' and orientation layers 14 and 14' are disposed on the ITO electrode patterns 10 and 10', respectively. Disposed between the lower substrate 4 and the ITO electrode pattern 10' are a reflective layer 6 and a first diffuser layer 8. Disposed between the orientation layers 14 and 14' is a liquid crystal layer 16.

A polarizer layer 18 and a second diffuser layer 20 are in this order disposed on an outer surface of the upper substrate 2. A retardation film may be further disposed on the outer or inner surface of the upper substrate 2 in case of an STN-LCD.

In the above described reflective LCD, only 50% of outer light introduced into the LCD as linear polarization by the polarizer layer 18 can be used to display an image. That is, the conventional reflective LCD has a drawback of a low light efficiency.

To solve the above drawback, Japanese laid-open Patents No. 92-243226 and 97-258219 disclose reflective LCDs having a reflective plate which can improve light efficiency. The reflective plate is shown in FIG. 2 and is designated by the reference numeral 64.

The reflective plate 64 comprises a substrate 40, an unevenly-surfaced layer 60 formed on the substrate 40, and a reflective layer 62 deposited on and unevenly-surfaced by the unevenly-surfaced layer 60. To form the unevenly surfaced layer 60, a photoresist resin layer is first deposited on the substrate 40, then patterned using a photo-mask, thereby obtaining an uneven surface. The photoresist pattern is hardened through a heat-treatment process, then the reflective layer 62 is deposited on the substrate to cover the photoresist pattern.

However, in the reflective plate 64, since the uneven surface of the reflective layer is formed in a uniform pattern as the same is formed through the photo-etching process, luminance may deteriorate by an interference of reflecting light.

In addition, to form the photosensitive pattern, additional devices such as a light exposure system and a mask, and additional processes such as an etching process are required. This increases manufacturing costs and complicates the manufacturing process.

SUMMARY OF THE INVENTION

The present invention has been made in an effort to solve the above-described problems of the prior art.

It is a first objective of the present invention to provide a reflective plate for an LCD in which a reflective layer is unevenly non-uniformly surfaced to prevent the interference of reflecting light.

It is a second objective of the present invention to provide a method for making a reflective plate in which the reflective plate can be easily made without using a photo-masking device.

To achieve the first objective, the present invention provides a reflective plate used in a reflective LCD, which comprises a base substrate, a plurality of spacer cores dispersed on the base substrate, an adhesive disposed on the base substrate to attach the spacer cores on the base substrate, a combination of the spacer cores and the adhesive defining an unevenly non-uniformly surfaced layer, and a reflective layer deposited on the unevenly non-uniformly surfaced layer.

According to an embodiment of the present invention, the adhesive is deposited around the spacer cores, then molten by heat to attach the spacer cores on the base substrate. The spacer cores are made of silica or plastic.

According to another embodiment of the present invention, the spacer cores may be made of a same material with the adhesive. Preferably, the material may be a thermosetting resin.

Preferably, each of the spacer cores is spherical having a diameter of about 1–10 μm. The spacer cores are randomly dispersed on the base substrate.

According to still another embodiment of the present invention, the reflective plate may further comprises a roughness adjusting layer disposed between the unevenly non-uniformly surfaced layer and the reflective layer.

According to the present invention, a surface roughness (k) of the reflective plate is 6–10 degree when the surface roughness (k) is defined by a following formula;

$$k = \sqrt{\frac{1}{L}\int_0^L \alpha^2 dx}$$

where, the L is a surface length of the substrate and α is a mean angle of surface inclination.

According to another aspect, the present invention provides a method for making a reflective plate used in an LCD, comprising the steps of preparing a base substrate, dispersing a plurality of spacers on the base substrate to form an uneven layer on the substrate, and depositing a reflective layer on the base substrate to cover the spacers.

According to still another aspect, the present invention provides a method for making a reflective plate used in an LCD, comprising the steps of pre-heating a lump of thermosetting resin, grinding the thermosetting resin into a powder, mixing the powder with pure water or isopropyl alcohol, spraying the mixture on a substrate in a randomly scattered pattern, heating the sprayed mixture at a temperature higher than that for the preheating, melting the mixture, and hardening the mixture so that an unevenly non-uniformly surfaced layer formed on the substrate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENT

Reference will now be made in detail to the present preferred embodiment of the invention, an example of which is illustrated in the accompanying drawings.

Figure 1:
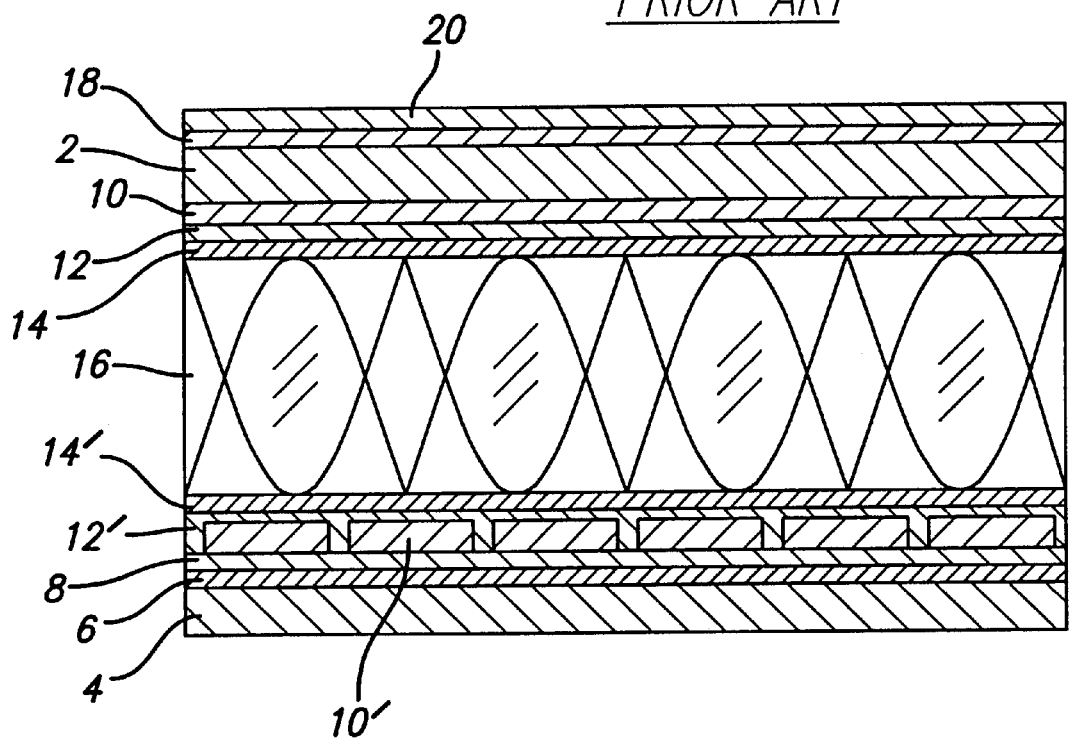
FIG. 1 is a sectional view of a conventional reflective LCD.
Figure 2:
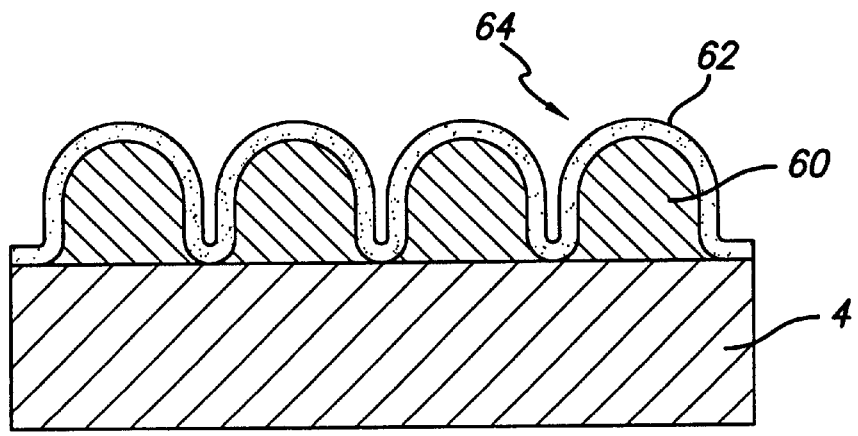
FIG. 2 is a sectional view of a conventional reflective plate.
Figure 3:
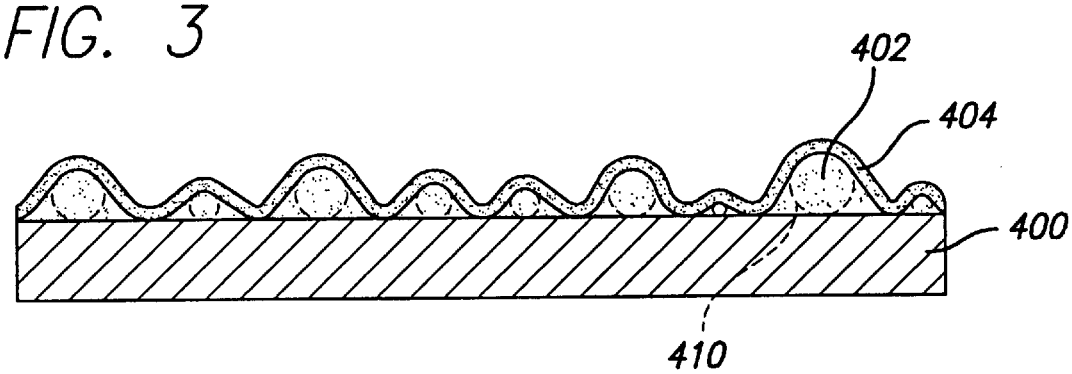
FIG. 3 is a sectional view of a reflective plate according to a first embodiment of the present invention.

FIG. 3 shows a reflective plate according to a first embodiment of the present invention.

The reflective plate comprises a substrate 400, an unevenly non-uniformly surfaced layer 402 formed on the substrate 400, a reflective layer 404 formed on the unevenly non-uniformly surfaced layer 402 following the unevenness and the non-uniformity of the layer 402.

Figure 4A:
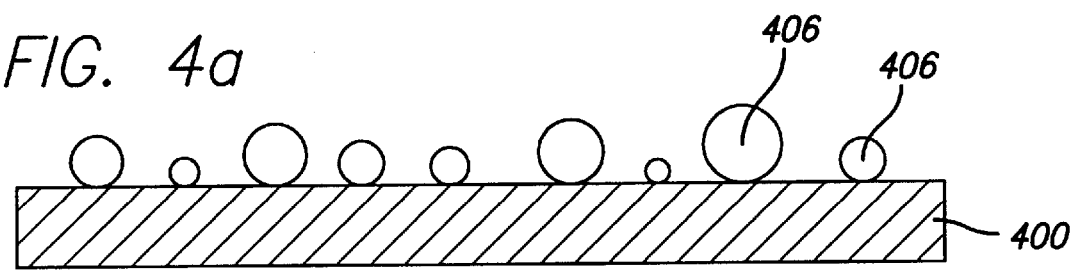
FIGS. 4a and 4c illustrate, in cross-section, a portion of a reflective plate depicted in FIG. 3 as it undergoes sequential processing steps.
Figure 4A:
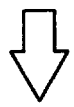
Figure 4B:
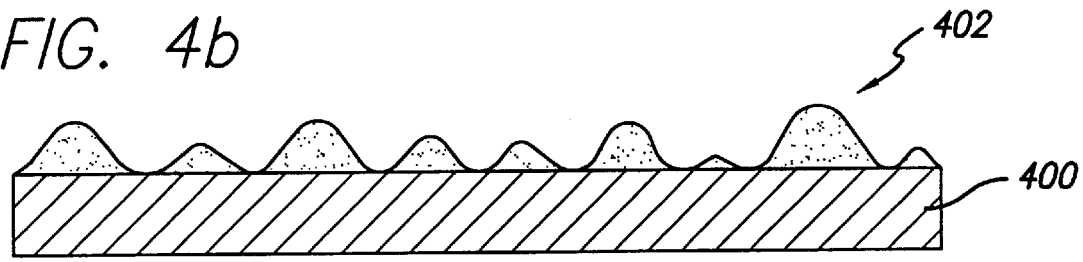
Figure 4B:
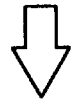
Figure 4C:
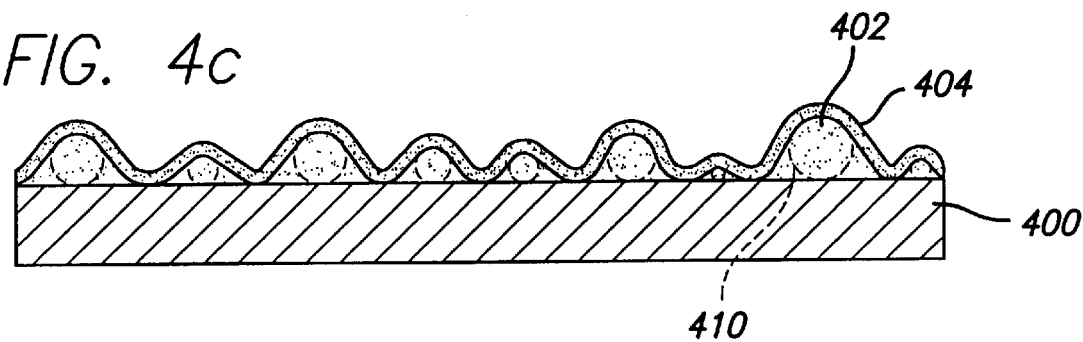

FIGS. 4a to 4c show a method for fabricating the reflective plate depicted in FIG. 3.

Referring first to FIG. 4a, a plurality of spacers 406, which are made of thermosetting resin and have differing sizes are dispersed on the substrate 400. After this, the adhesive spacers 406 are heated such that surfaces thereof can be molten as shown in FIG. 4b, after which the adhesive spacers 406 are hardened, thereby providing the unevenly non-uniformly surfaced layer 402 on the substrate 400.

Next, as shown in FIG. 4c, the reflective layer 404 is deposited on the unevenly non-uniformly surfaced layer 402 at an equal thickness.

Describing more in detail, a lump of thermosetting resin such as acrylite is pre-heated, then ground into a powder having a granule size of less than 10 μm. The powder is mixed with pure water or isopropyl alcohol, thereby obtaining a liquid mixture.

The mixture liquid is sprayed on the substrate 400 in a randomly scattered pattern so that the sprayed liquid becomes the adhesive spacers as shown in FIG. 4a. The sprayed adhesive spacers are further heated at a temperature higher than that for the preheating so that surfaces thereof are molten on the substrate 400. After this, the adhesive spacers are hardened, thereby obtaining the unevenly non-uniformly surfaced layer 402 formed on the substrate 400 as shown in FIG. 4b. That is, unmolten portions of the spacers become cores 410 for making the layer 402 uneven and non-uniform.

Following the above, an aluminum alloy or chrome is deposited on the layer 402 following the unevenness and non-uniformity as shown in FIG. 4c.

The reflectance of the reflective plate depends on the surface roughness thereof. The surface roughness (k) can be defined by the following formula:

$$k = \sqrt{\frac{1}{L}\int_0^L \alpha^2 dx}$$

Where, the L is a surface length of the substrate and α is a mean angle of surface inclination.

Figure 5:
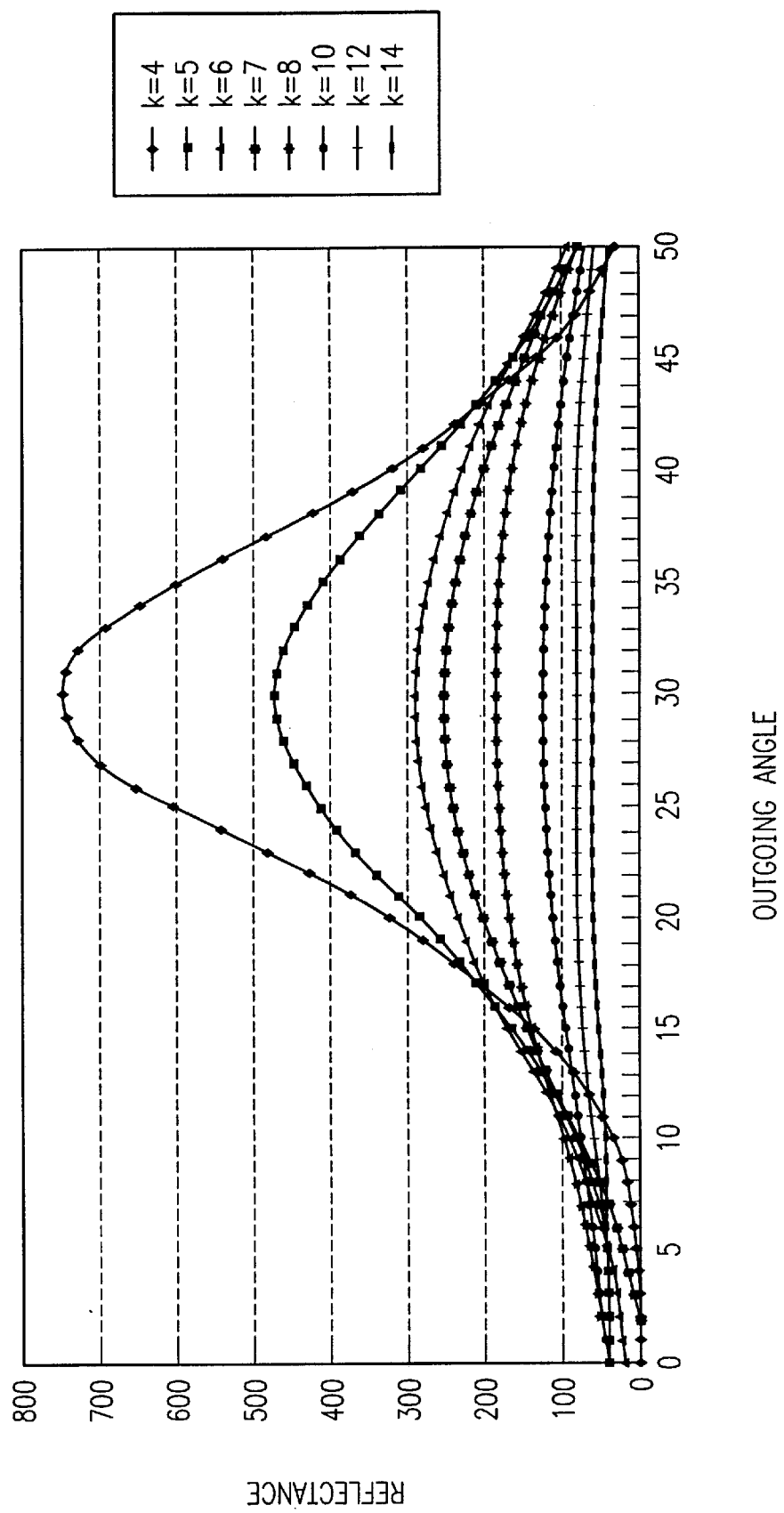
FIG. 5 is graph illustrating the operational effect of the present invention.

FIG. 5 shows a graph illustrating the variation of the reflectance according the variation of the surface roughness (k), in which the incident light is introduced at an incident angle of 30 degrees with respect to a direction normal to the substrate, and is reflected at an outgoing angle of 0–50 degrees.

As shown in FIG. 5, the variation of the reflectance of the reflective plate is inversely proportional to the surface roughness (k). In addition, as the surface roughness (k) is reduced, the reflectance is increased. That is, when the surface roughness is 4, a maximum amount of reflectance is realized. However, the surface roughness of 4 means that the surface of the reflective plate is almost flat. Therefore, the light scattering efficiency deteriorates while the reflectance is increased. In addition, if the surface roughness is above 10, the reflectance deteriorates.

Therefore, when the surface roughness (k) is in a range between 6–10, the optimal reflectance and scattering efficiency can be obtained.

Accordingly, in the present invention, by varying the size and density of the spacers 406 between 1–10 μm and 2–50%, respectively, the reflective plate having the surface roughness (k) of 6–10 was obtained.

Figure 6:
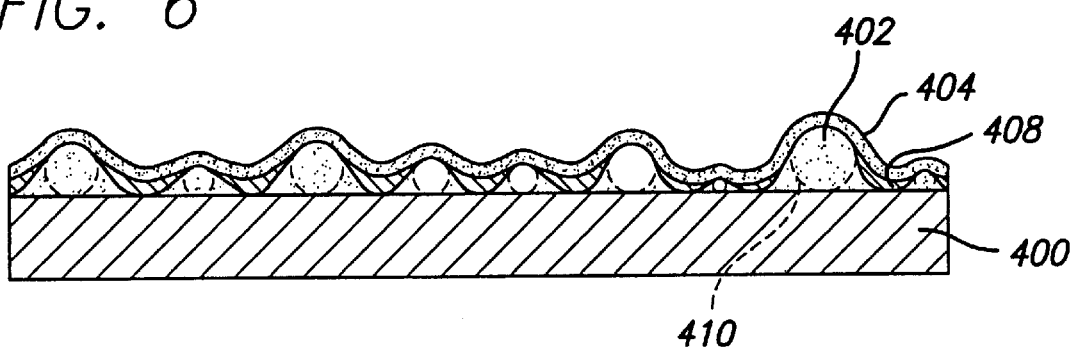
FIG. 6 is a sectional view of a reflective plate according to a second embodiment of the present invention.

FIG. 6 shows a reflective plate according to a second embodiment of the present invention.

In this embodiment, to adjust the surface roughness of the reflective plate, a roughness-adjusting layer 408 may be further formed in the valleys, then the reflective layer 404 may be formed on the roughness-adjusting layer 408 and the unevenly non-uniformly surfaced layer 402. The material for the roughness-adjusting layer 408 is selected from materials similar to that used for the adhesive spacers. In addition, the roughness-adjusting layer 408 is formed through a spin-coating process. That is, if the liquid material for the roughness adjusting layer 408 is deposited while rotating the substrate 400 on which the unevenly non-uniformly surfaced layer 402 is formed, the roughness adjusting layer 408 can be formed at a uniform thickness.

Figure 7A:
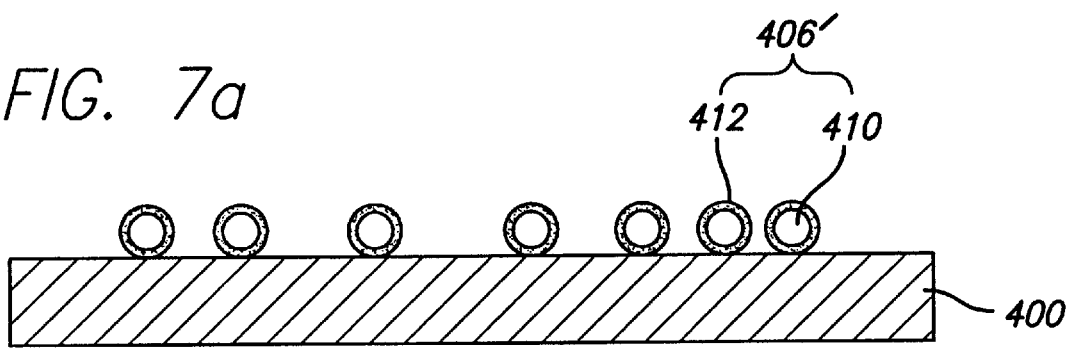
FIGS. 7a to 7b illustrate, in cross-section, a portion of a reflective plate according to a third embodiment of the present invention as it undergoes sequential processing steps.
Figure 7B:
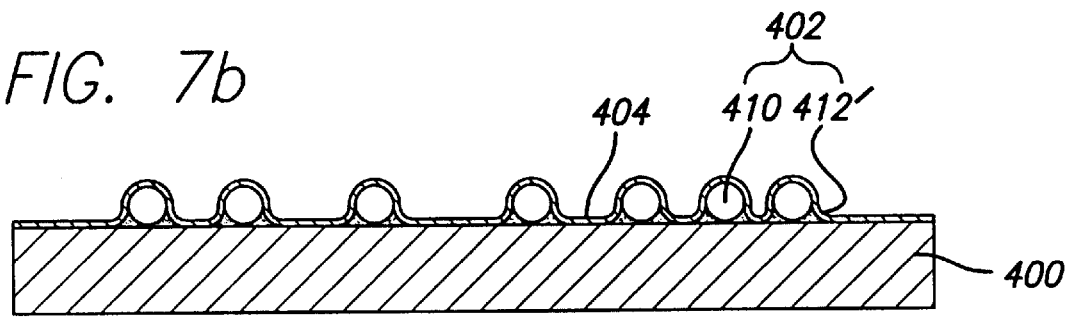

FIGS. 7a and 7b show a method for fabricating a reflective plate according to a second embodiment of the present invention.

As shown in FIG. 7a, a base substrate 400 is prepared, then a plurality of disperse spacers 406' are dispersed on the base substrate 400. Each of the spacers 406' comprises a spacer core 410 and an adhesive layer 412 disposed around the core 410.

Preferably, the spacer core 410 is spherical having a diameter of about 1–10 μm and made of a silica or plastic material.

After dispersing the spacers on the base substrate 400, the base substrate 400 is heated at a predetermined temperature so that each adhesive 412 is molten. Then, the base substrate 400 is cooled so that the molten adhesive 412 is hardened, thereby causing the spacers to be integrated on the surface of the base substrate 400. Next, a reflective layer 404 is deposited on the substrate 400 to cover the spacers, thereby obtaining a reflective plate according to a preferred embodiment of the present invention.

As described above, since an etching process is not required to make the reflecting surface of the reflective plate in the present invention, the manufacturing process is greatly simplified.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A reflective plate used in a reflective LCD, comprising:
   a base substrate;
   a plurality of spacer cores dispersed on the base substrate;
   an adhesive disposed on the base substrate to attach the spacer cores on the base substrate, a combination of the spacer cores and the adhesive defining an unevenly non-uniformly surfaced layer; and
   a reflective layer deposited on the unevenly non-uniformly surfaced layer;
   wherein a surface roughness (k) of the reflective layer is 6–10 degree when the surface roughness (k) is defined by a following formula:

$$k = \sqrt{\frac{1}{L}\int_0^L \alpha^2 dx}$$

where the L is a surface length of the substrate and $\alpha$ is a mean angle of surface inclination.

2. The reflective plate of claim 1 wherein the adhesive is deposited around the spacer cores, then molten by heat to attach the spacer cores on the base substrate.

3. The reflective plate of claim 2 wherein the spacer cores are made of silica or plastic.

4. The reflective plate of claim 2 wherein the spacer cores are made of a same material with the adhesive.

5. The reflective plate of claim 4 wherein the material is a thermosetting resin.

6. The reflective plate of claim 1 wherein each of the spacer cores have a diameter of about 1–10 $\mu$m.

7. The reflective plate of claim 1 wherein the spacer cores are randomly dispersed on the base substrate.

8. The reflective plate of claim 1 further comprising a roughness-adjusting layer disposed between the unevenly non-uniformly surfaced layer and the reflective layer.

9. A method for making a reflective plate used in an LCD, comprising the steps of:
   preparing a base substrate;
   dispersing a plurality of spacers on the base substrate to form an unevenly non-uniformly surfaced layer on the substrate; and
   depositing a reflective layer on the base substrate to cover the spacers;
   wherein a surface roughness (k) of the reflective layer is 6–10 degree when the surface roughness (k) is defined by a following formula;

$$k = \sqrt{\frac{1}{L}\int_0^L \alpha^2 dx}$$

where the L is a surface length of the substrate and $\alpha$ is a mean angle of surface inclination.

10. The method of claim 9 wherein each of the spacers comprising a spacer core and an adhesive is deposited around the spacer core, and wherein the step of dispersing a plurality of spacers further comprises the steps of:
   causing the adhesive deposited around the spacer cores to be molten; and hardening the molten adhesive such that the spacer cores are attached on the base substrate.

11. The method of claim 9 wherein the spacer cores are made of silica or plastic.

12. The method of claim 9 wherein the spacer cores are made of a same material with the adhesive.

13. The method of claim 9 wherein each of the spacer cores is spherical having a diameter of about 1–10 $\mu$m.

14. The method of claim 9 wherein the spacer cores are randomly dispersed on the base substrate.

15. The method of claim 9 further comprising the step of depositing a resin layer between the unevenly non-uniformly surfaced layer and the reflective layer.

16. A method for making a reflective plate used in an LCD, comprising the steps of:
   preparing a base substrate;
   dispersing a plurality of spacers on the base substrate to form an uneven layer on the substrate;
   depositing a reflective layer on the base substrate to cover the spacers, wherein the dispersing step further includes:
   pre-heating a lump of thermosetting resin;
   grinding the thermosetting resin into a powder;
   mixing the powder with isopropyl alcohol;
   spraying the mixture on the base substrate in a randomly scattered pattern;
   heating the sprayed mixture at a temperature higher than that for the pre-heating;
   melting the mixture; and
   hardening the mixture so that an uneven non-uniform surface layer is formed on the base substrate.

17. The method of claim 16 further comprising the step of depositing metal layer on the unevenly non-uniformly surface layer.

18. The method of claim 17 wherein the thermosetting resin is acrylite.

19. The method of claim 17 wherein the powder has a granule size of less than 10 $\mu$m.

* * * * *